DEVICE FOR HOLDING AND EMPTYING TUBES

Original Filed March 4, 1969

INVENTORS
ELSE HAUSMANN
HEINRICH HAUSMANN by
Sandoe, Hopgood & Calimafde
ATTORNEYS United States Patent Office Re. 27,689
Reissued June 26, 1973

27,689

DEVICE FOR HOLDING AND EMPTYING TUBES

Else Hausmann and Heinrich Hausmann, both of 3 Hegauweg, Jestetten, Baden, Germany Original No. 3,525,457, dated Aug. 25, 1970, Ser. No. 804,109, Mar. 4, 1969. Application for reissue June 8, 1972, Ser. No. 261,113
Claims priority, application Germany, Mar. 7, 1968, 1,611,934
Int. Cl. B65d *35/34*
U.S. Cl. 222—100 7 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a holder for grasping tubes, such as toothpaste tubes, at their lower ends. A simple construction utilizes a housing, a plate spring which snap-fits into the housing, and a wind up key.

The present invention relates to a tube holder which is adapted to hold tubes grasped at their lower end, to wind them up by means of turning keys in the housing and thereby empty them. A pressure spring holds all the parts together and effects complete emptying of the tubes.

Such a tube holder is already known, see my German Petty Pat. No. 1,959,870 as well as Borkenhagen 3,219,-238, which, while they serve the purpose are bulky, and not esthetically pleasing. In the case of these two holders, the full length cannot be utilized and their handiness leaves much to be desired.

The object of the present invention is not only to provide a suitable article of use, but to provide an attractive gift article of great utility.

A further object of my invention is to provide a tube holder which is simple in construction and has few parts.

Still another object of this invention is to provide a tube holder having a resilient plate spring which snap fits into the housing and holds a turnkey in place.

Yet another object of this invention is to provide a tube holder which may be used on its full length and on opposite sides of the housing.

Briefly, in my invention I provide a tube holder comprising a housing. A fully movable pressure spring is arranged in the opening of the housing said spring not extending beyond the length of housing. Its purpose is to prevent the turning key from falling or slipping out and nevertheless to assure a soft turning, pushing in and pulling out without actuation of any further safety device. It furthermore assures a softer pressing of the tube against the housing and guarantees the maximum possible emptying. The grip trough provided on both sides of the upper half of the housing makes possible easy handling. The slight curvature on the outside of the housing which broadens against the base is provided for decoration, ornamentation and writing. The few individual parts are well-suited for mass production, particularly as ordinary material, such as porcelain, plastics, metal, etc., is used. The assembling is possible within a short time without tools and without expert knowledge.

The turning key can be pushed blindly in the housing opening. Due to the arcuate pressure spring, the turning key is automatically brought into the correct position. It is held thus without other elements. In order to provide adherence to different surfaces, magnets or suction cups can be provided on the base of the tube holder.

The above-mentioned and other features and objects of this invention and the manner of attaining them will become more apparent and the invention itself will be best understood by reference to the following description of embodiments of the invention taken in conjunction with the accompanying drawing, wherein.

Figure 1:
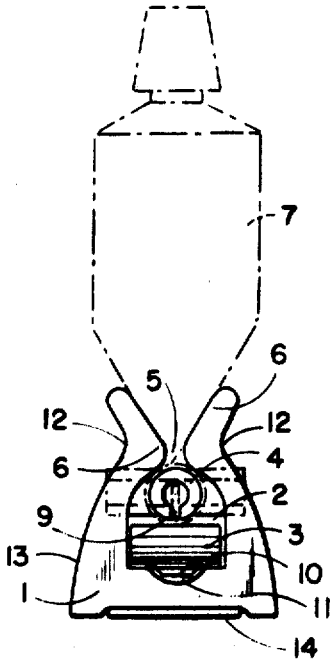
FIG. 1 shows the tube holder looking at the narrow side and the introduction end for the turning key.
Figure 2:
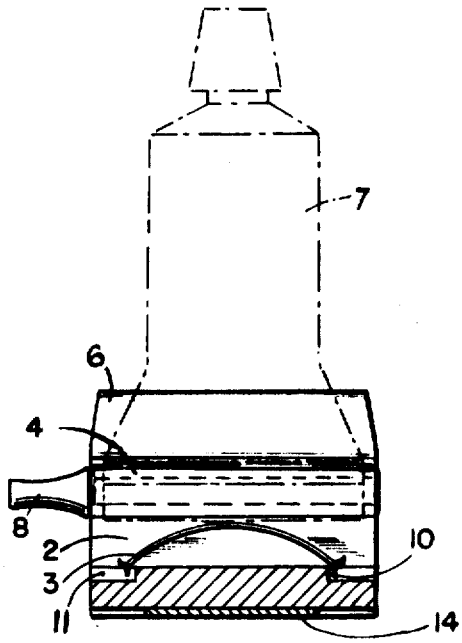
FIG. 2 is a schematic section lengthwise through the housing looking at the turning-key side and the pressure spring.

The tube holder shown in FIGS. 1 tnd 2 is developed as a housing 1 which has in its center a continuous opening 2 which is open towards the top and receives the pressure spring 3 and the turning key 4. The opening 5 widens in V-shape upwards and the introduction jaws 6 hold the tube 7 in the desired direction. The turning key 7 with turning handle 8 receives in its introduction slot 9, a tube mounted at the lower end. The pressing spring 4 with its bent portions 10 places itself in the recesses 11 of the housing 1 whereby accidental sliding out is avoided.

The pressure spring comprises flat resilient material, the ends of said spring having guide elements, said depressions or recesses 11 comprising two spaces in the upper surface of the base of the housing *comprising axial locating means*, said spaces being sufficiently longer than the thickness of the guide elements to accommodate movement of the spring ends when the spring is pressed by the turnkey.

Figure 3:
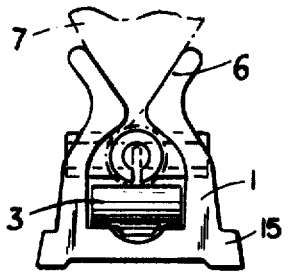
FIG. 3 shows the housing, made with lateral guide ledges, seen from the narrow side.
Figure 4:
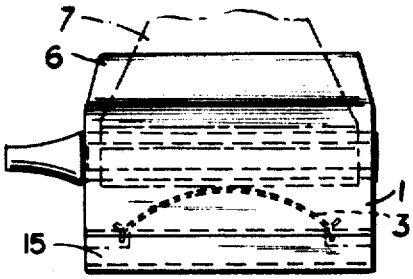
FIG. 4 shows the longitudinal side with guide ledge.

On the outer upper half of the housing 1, there are provided grip recesses 12 for easy handling and, below same, the surfaces 13 for decoration, ornamentation and writing. The base 14 can be equipped with magnet or suction cup. In FIGS. 3 and 4, the housing 1 is developed as a guide ledge 15 and thus makes possible the holding fast thereof or the placing thereof in guide rails.

Priority of applicant's German application No. 1,611,-934, filed on Mar. 7, 1968 is claimed.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A tube holder for winding up and simultaneously emptying tubes, comprising a housing, a turning key held in said housing, said key having a slot to receive the end of the tube, a movable arcuate pressure spring which digs equally and oppositely in two housing depressions, holds itself and presses against the turning key, thereby making any further securing device unnecessary and thus the turning key and housing can be used in full length or tube width.

2. Tube holder according to claim 1, in which the housing includes a large introduction opening which narrows towards the center of the housing, said arcuate pressure spring positioning the turning key to receive the tube, whereby the turning key can be blindly inserted.

3. Tube holder according to claim 1, in which a magnet or suction cup is arranged on the housing.

4. Tube holder according to claim 3, in which the housing includes guide ledges.

5. The tube holder of claim 1 in which the pressure spring comprises flat resilient material, the ends of said spring having guide elements, said depressions comprising two spaces in the upper surface of the base of the housing, said spaces being sufficiently longer than the thickness of the guide elements to accommodate movement of the spring ends when the spring is pressed by the turnkey.

6. A tube holder for winding up and simultaneously emptying tubes, comprising a housing, a turning key held in said housing, said key having a slot to receive the end of the tube, a movable arcuate pressure spring, axial locating means formed in said housing, said movable arcuate pressure spring being held in position by said locating means and pressing against said turning key, thereby making any securing device unnecessary and thus the turning key and housing can be used in full length of tube width [.],

*said housing including a large introduction opening which narrows towards the center of the housing,*

*said arcuate pressure spring further positioning the turning key to receive the tube, whereby the turning key can be blindly inserted.*

[7. A tube holder according to claim 6, in which the housing includes a large introduction opening which narrows towards the center of the housing, said arcuate pressure spring positioning the turning key to receive the tube, whereby the turning key can be blindly inserted.]

*8. A tube holder for winding up and simultaneously emptying tubes, comprising*

*a housing having a continuous opening,*

*a turning key positioned in said continuous opening and held in said housing, said housing including V-shaped introductory jaws, the said continuous opening between said jaws corresponding widening in V-shaped upwards,*

*said key having an introduction slot to receive the tube,*

*a movable arcuate pressure spring having at least one guide element,*

*axial locating means in the upper surface of the base of the housing, said guide element being placed in said axial locating means,*

*said movable arcuate pressure spring held in position in said continuous opening by said locating means,*

*said arcuate pressure spring further positioning the turning key and pressing against said turning key to receive the tube and for pressing the end of the tube against said jaws and holds the tube in the desired direction,*

*thereby making any securing device unnecessary and thus the turning key and housing can be used in full length of the tube width,*

*and whereby the turning key can be blindly inserted.*

References Cited

The following references, cited by the Examiner, are of record in the patented file of this patent or the original patent.

UNITED STATES PATENTS

| | | | |
|---|---|---|---|
| 1,894,936 | 1/1933 | Austin | 222—97 |
| 2,183,060 | 12/1939 | Blake | 222—98 |
| 1,973,543 | 9/1934 | Simon | 222—98 |
| 2,542,571 | 2/1951 | Rakestraw | 222—100 |

SAMUEL F. COLEMAN, Primary Examiner

N. L. STACK, Jr., Assistant Examiner